United States Patent [19]  
Chuang et al.

[11] Patent Number: 5,009,872  
[45] Date of Patent: Apr. 23, 1991

[54] METHOD OF OXIDIZING GASEOUS SUBSTANCES

[75] Inventors: Karl T. Chuang, Edmonton, Canada; James B. McMonagle, Birdhill, Ireland; Robert J. Quaiattini, Calgary, Canada; William A. Seddon, Deep River, Canada; David E. Clegg, Pembroke, Canada

[73] Assignee: Atomic Energy of Canada Ltd., Ontario, Canada

[21] Appl. No.: 275,188

[22] Filed: Nov. 23, 1988

Related U.S. Application Data

[63] Continuation-in-part of Ser. No. 166,742, Mar. 2, 1988, abandoned, which is a continuation of Ser. No. 46,541, Jun. 5, 1987, abandoned.

[30] Foreign Application Priority Data

May 12, 1986 [CA] Canada ................................. 508959

[51] Int. Cl.$^5$ ............................................. B01D 53/36
[52] U.S. Cl. .................................. 423/245.3; 423/247; 502/159
[58] Field of Search ................... 423/213.5, 245.3, 247, 423/213.2; 502/159

[56] References Cited

U.S. PATENT DOCUMENTS

| 3,804,756 | 4/1974 | Callahan et al. ................. 423/245.1 |
| 4,025,560 | 5/1977 | Rolston et al. ....................... 423/580 |
| 4,061,724 | 12/1977 | Grose et al. ......................... 423/335 |
| 4,176,161 | 11/1979 | Mitchell et al. ..................... 423/247 |
| 4,234,549 | 11/1980 | Stanley et al. ................... 423/245.3 |
| 4,252,678 | 2/1981 | Smith .................................... 502/159 |
| 4,280,926 | 7/1981 | Abe et al. .......................... 423/213.2 |
| 4,298,502 | 11/1981 | Carlson ............................... 502/159 |
| 4,323,542 | 4/1982 | Joy, III ............................. 423/213.5 |
| 4,383,956 | 5/1983 | Croft et al. ........................... 55/524 |
| 4,563,371 | 1/1986 | Sirinyan et al. ..................... 502/159 |
| 4,652,537 | 3/1987 | Tamura et al. ..................... 423/247 |

FOREIGN PATENT DOCUMENTS 0015585 9/1980 European Pat. Off. .  
2236497 8/1973 Fed. Rep. of Germany .  
2063216 9/1971 France .

OTHER PUBLICATIONS

Langmuir, I. J., Am. Chem. Soc., 37 1162, 1915.  
Langmuir, I. J., Trans. Faraday Soc., 621, 1922a.  
Langmuir, I. J., Trans. Faraday Soc., 17, 672, 1922b.  
Thomas, C. L., Catalytic Processes & Proven Catalysts, Academic Press, New York, 1970.  
Collins, M. F., The Catalysis Society, Ninth North American Meeting, Houston, Texas, 1985, Mar. 17–21.

*Primary Examiner*—Jeffrey E. Russel  
*Attorney, Agent, or Firm*—Nixon & Vanderhye

[57] ABSTRACT

A method is provided for oxidizing gases such as, for example, CO, aldehydes having carbon atoms in the range 1 to 5 (e.g. formaldehyde), ketones having carbon atoms in the range 3 to 5, and alcohols having carbon atoms in the range 1 to 5, wherein the gas at a relative humidity in the range 0 to 100% and an input temperature in the range −50° to 150° C. is contacted with a catalyst assembly comprising (a) a hydrophobic support having a surface area in the range 50 to 1,500 m$^2$/g and selected from the group consisting of silicalite, silylated silica, and styrene divinylbenzene polymers, and, on said support (b) a catalytically active metal selected from the group consisting of chromium, molybdenum, tungsten, manganese, rhenium, iron, ruthenium, osmium, cobalt, rhodium, platinum, iridium, nickel, copper and silver, said metal being present in an amount in the range 0.1 to 22 wt % of the total weight of the catalyst assembly. The catalyst assemblies used are generally catalytically active in the presence of liquid water and water vapor for longer periods than known catalyst assemblies and function at ambient temperatures.

15 Claims, No Drawings

METHOD OF OXIDIZING GASEOUS SUBSTANCES

RELATED APPLICATIONS

This application is a continuation-in-part of application Ser. No. 166 742 filed Mar. 2, 1988, now abandoned which is a continuation of application Ser. No. 046 541 filed May 6, 1987, now abandoned.

BACKGROUND OF THE INVENTION

The invention relates to a method of oxidizing gaseous substances.

Most known oxidation catalysts for gases such as CO, lower alcohols aldehydes and ketones function very poorly, if at all, in the presence of liquid water and water vapor. Furthermore, these oxidation catalysts function very poorly, if at all, at ambient temperatures.

There is a need for a method of oxidizing these gases wherein the catalyst used will function satisfactorily in the presence of liquid water and water vapor and which function satisfactorily at ambient temperatures.

There is a particular need for a method of oxidizing CO which will function well as ambient temperatures. Carbon monoxide (CO) is a colorless, odorless gas that is extremely toxic. It has an affinity for blood oxyhemoglobin that is over 200 times greater than that of oxygen. The result is that blood will have a reduced capacity for carrying oxygen if breathing air contains CO. The American Council of Government Industrial Hygienists (ACGIH) recommends a threshold limit value time weighted average (TLV-TWA) for CO of 50 ppm for a typical 40 hour work week. Because of a wide variation of individual susceptibility, some people may experience discomfort at levels below the TLV-TWA recommended limit. The acceptable level of CO should be even lower in the domestic environment where, for example, infants and children spend nearly their full day. Thus, there is a need for a process of oxidizing carbon monoxide which works at a low enough temperature and pressure for use in the home or workplace.

There is also a need for a method of oxidizing CO in controlled environmental chambers, such as submarines and undersea diving bells and welding chambers. In at least some of these environments, the humidity levels can be high and the desire for low power consumption is great.

There is a further need for a method of oxidizing CO for an efficient CO removal/filtering device for gas masks used, for example, by firefighters. If a suitable method existed, the need to carry bottled air for breathing could in many instances be eliminated.

There is also a need for low temperature oxidation of other pollutant gases such as lower alcohols, aldehydes and ketones. Such pollutants can arise in the normal household. For instance, formaldehyde is often liberated from synthetic carpets, particle board and cooking. They also arise in many industrial processes.

One well known and commonly used method for carbon monoxide oxidation uses a catalyst that is a proprietary mixture of oxides of manganese and copper marketed under the trade name HOPCALITE, by Mine Safety Appliance Company, Pittsburgh, U.S.A. The catalyst is deactivated by adsorption of water vapor, and can only be used when the relative humidity level is low. The catalyst is therefore kept hot or dried to prevent water adsorption.

A second known method of CO oxidation uses transition metal catalysts. The carbon monoxide reaction on transition metals has been widely studied for many years. See for example Langmuir, I., J., Am. Chem. Soc., 37, 1162, 1915; Trans. Faraday Soc., 621, 1922; Trans. Faraday Soc., 17, 672, 1922. Practical transition metal catalysts for CO oxidation were used, for example, in the first generation of catalytic converters for automobiles. These catalysts consisted of platinum and/or palladium deposited onto a highly porous high surface area support, such as for example alumina in the form either of 1.5-3 mm pellets or a "wash coat" on the walls of a ceramic or metal monolith.

Although alumina is hydrophilic, (that is, it has a tendency to attract and adsorb water vapor) this is not a problem in catalytic converters. As the converters operate at high temperature (500° C. and higher), water vapor present in the gases passing through the converter does not condense in the pores of the alumina support material. Hence the catalyst performance remains high.

At ambient temperatures and high relative humidities, however, alumina does adsorb water, and the pores can rapidly become filled with condensed water vapor. Therefore, the type of catalyst used in the automobile catalytic converter cannot remain active for long periods of time unless it is heated to prevent water adsorption.

Similar catalysts for use at high temperatures are known from French Patent No. 2,063,216 (VEB Synthesewerk Schwartzheide), U.S. Pat. No. 3,804,756 (Callahan) and U.S. Pat. No. 4,323,542 (Joy III). In the French Patent, the catalysts are metal oxides, platinum or palladium, which can be mounted on a support, and the process is carried out at from 250° C. to 500° C. In Callahan, the catalyst is a metal oxide, which may be supported on aluminum, silica or the like, the gaseous substance to be oxidized is entrained in steam, and the process is carried out at 250°-700° C. In Joy III, the catalyst is a specific three-component catalyst comprising uranium, rhodium, and platinum or palladium on alumina, silica or the like and the process is carried out at temperatures above 200° C.

The third known method of CO oxidation uses a catalyst that is a variant of what is commonly referred to as the Wacker process catalyst. In the commercial Wacker process, an aqueous solution of $CuCl_2$ containing traces of $PdCl_2$ is used in a vertical reactor to oxidize ethylene partially to acetaldehyde with yields of about 95%. See Thomas, C. L., Catalytic Processes and Proven Catalysts, Academic Press, New York, 1970.

One variant of the Wacker process catalyst that has been shown to be active for oxidation of CO is the catalyst marketed under the trade name Low Temperature Catalyst (LTC) by Teledyne Water-Pik Inc., Fort Collins, Colo., U.S.A. It consists of $CuCl_2$ with small amounts of $PdCl_2$, all supported on porous alumina beads. See Collins, M. F., The Catalysis Society, Ninth North Americal Meeting, Houston, Tex., 1985, Mar. 17-21. While this catalyst has been shown to remain active over a wide humidity range, it suffers from loss of performance at humidity levels below about 20% or above 65%. This is a type of supported liquid phase catalyst; it is believed that a surface film of water exists on the alumina, providing a solution medium for the $CuCl_2/PdCl_2$ mixture. Inadequate water renders the catalytic agents inactive by reducing their mobility, while too high a level of moisture results in the pores of the alumina support filling with water, thereby increasing the diffusive resistance for the reactants. This latter case is a similar situation to what would occur with the auto exhaust converter type of alumina catalyst.

A carbon catalyst for oxidizing CO to $CO_2$ at ambient temperatures has also been reported (Tamura, U.S. Pat. No. 4,652,537). The catalyst has a hydrophobic coating put on it by coating with a monomer which is polymerized in situ.

STATEMENT OF THE INVENTION

According to the present invention there is provided a method of oxidizing at least one gaseous substance selected from the group consisting of carbon monoxide, aldehydes having 1-5 carbon atoms, ketones having 3-5 carbon atoms and alcohols having 1-5 carbon atoms, which process comprises contacting a gas mixture comprising an oxidizing gas and said gaseous substance at an input temperature of $-50°$ C. to $150°$ C., with a catalyst assembly comprising:

(a) a hydrophobic, porous support having a surface area in the range 50 to 1500 $m^2/g$ and selected from the group consisting of a crystalline silica ($SiO_2$) lattice essentially free of aluminum oxide in the $SiO_2$ lattice, silylated silica and styrene divinylbenzene copolymers and, on the support, (b) at least one catalytically active metal selected from the group consisting of chromium, molybdenum, tungsten, manganese, rhenium, iron, ruthenium, osmium, cobalt, rhodium, iridium, nickel, palladium, platinum, copper, and silver, the amount of catalytically active metal being in the range 0.1 to 22 wt % of the total weight of the support and catalytically active metal.

The invention also comprises supported catalyst bodies useable in the process.

DETAILED DESCRIPTION OF THE INVENTION

The process and catalysts of the invention permit the oxidation of gaseous substances such as carbon monoxides, lower aldehydes, ketones and alcohols at ambient pressures and temperatures, even when only small amounts of such substances are present. Further, the process can be carried out at any concentration of water vapor. Indeed, appreciable oxidation will occure even in the presence of liquid water, such as in a trickle bed reactor, where the gas stream containing the substance or substances to be oxidized is flowed counter-current to a stream of liquid water.

In some embodiments of the present invention the hydrophobic support with the catalytically active metal thereon may be in the form of discrete particles deposited on a second, inert, conventional support such as a ceramic support, or on a metal screen. In these embodiments the discrete particles may be secured to the second support by means of a liquid-water-repellant, water vapor permeable, coating of an organic resin or polymer. The coating may be of polytetrafluoroethylene or a silicone. For example, suitable silicone coatings include a poly-siloxane such as polyalkylsiloxane having substituent groups selected from hydroxyl, methoxyl and ethoxyl or a polydimethysiloxane having a minor amount of substituent groups selected from hydroxyl, methoxyl and ethoxyl and may include at least one substituent selected from the ethyl, propyl, isopropyl and t-butyl groups.

The crystalline silica ($SiO_2$) lattice essentially free of aluminum oxide in the $SO_2$ lattice used for the support may be that known as "silicalite" and described in U.S. Pat. No. 4,061,724, dated Dec. 6, 1977, R. W. Grose and E. M. Flanigen, and assigned to Union Carbide Corporation.

Silylated silica is made by reacting a silica having a suitable particle size with a silane, such as for example trimethylvinylsilane.

Styrene-divinylbenzene copolymer according to the invention is commercially available under the trade mark XAD-4 from Rohm & Haas Company or can be made by reacting under suitable reaction conditions to get a porous polymer, divinylbenzene with a monomer of the formula:

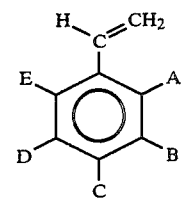

in which A to E are selected from the group consisting of hydrogen and lower alkyl ($C_1$ to $C_4$) groups and may be the same or different. The reaction can be carried out by preparing a 50:50 by weight mixture of divinylbenzene and styrene or a substituted styrene. As an example, SDB synthesis will be described using ethylvinylbenzene as the styrene component. A 50:50 by weight mixture of divinylbenzene and ethylvinylbenzene obtainable commercially from Fluka Chemical Corp. is mixed with an equal weight of 2-methylpentanol (obtainable from Alfa Products, Morton Thiokol) and 0.4% by weight of the final solution of 2,2-azobis (2 methyl-pentanol) is added. The mixture is heated at $85°$ C. in a water bath until a block of solid porous polymer forms. The block is crushed, heated at $250°$ C. under helium gas purge to remove 2-methylpentanol, and sieved to the desired particle size.

The process according to the present invention may be used to, for example:

(i) convert CO into $CO_2$;
(ii) oxidize aldehydes having 1-5 carbon atoms (e.g. formaldehyde) to $CO_2$;
(iii) oxidize alcohols having 1-5 carbon atoms (e.g. ethanol and methanol) to $CO_2$; and
(iv) oxidize ketones having 3-5 carbon atoms to $CO_2$.

In the preferred embodiment, the gaseous substance is at least one substance selected from the group consisting of carbon monoxide, ethanol, methanol, 2-propanone and formaldehyde.

Preferably the surface area of the support is in the range 200 to 600 $m^2/g$. The support is present as particles sized between 0.1 micron and 500 microns, preferably between about 44 microns and 149 microns (eg. U.S. sieve sizes 325 to 100).

A preferred support is of porous styrene divinylbenzene copolymer in particles sized between 44 microns and 149 microns.

In some embodiments of the present invention the catalytically active metal comprises at least two metals selected from the group consisting of platinum, palladium, rhenium, osmium, iridium, cerium, nickel, rhodium and ruthenium, and one of the metals is present in the range 1:1 to 40:1 by weight to that of the other metal or metals present. Preferably platinum comprises one of the said at least two metals. Thus, in a preferred embodiment, the catalytically active metal is platinum together with either iridium or rhodium, wherein the platinum is present in the range 1:1 to 40:1 by weight to that of the other metal.

According to the invention, the input temperature of the gas stream comprising the gaseous substance to be oxidized is kept in the range from −50° to 150° C. as it is fed to the catalyst. The oxidation reaction is exothermic, and the temperature of the catalyst will rise if some steps are not taken to keep the temperature low. With a catalyst support which can burn in air (for example styrene-divinybenzene copolymer) care must be taken to ensure that the temperature does not rise to combustion temperature. This may be ensured by (for example) using the catalyst in a trickle bed arrangement, where water forms the trickling fluid. Even with catalyst supports which do not burn (such as, for example, silica) high temperatures together with concentrations of oxidizable gaseous substance of the order of 2% or over may decrease conversion efficiency, because the catalyst may become poisoned. It is preferred therefore that the gaseous substance be present in concentrations of less than 2%, and more preferably less than 1%. Where the support does not burn and the catalyst does not become poisoned, the temperature of the catalyst may be allowed to rise beyond the temperature of the input stream. The catalyst retains its particular advantages of operating over all ranges of water vapor content and with an ambient temperature feed even under such conditions.

The process of the invention is not pressure-sensitive. It can be run at superatmospheric pressures if desired. Sub-atmospheric pressures will tend to reduce reaction rates, as fewer reacting species will come into contact with the catalyst, but may be suitable in some situations. In general, it is preferred to run the process at atmospheric pressure, as then no special pressure vessels need to be used and the apparatus can be simpler.

The oxygen in the feed gas may be, for example, in the form of pure oxygen, air or ozone. A stoichiometric excess of oxygen is used for oxidation of the amount of the gaseous substance present, so that complete oxidation will occur. The gaseous substance to be oxidized is preferably present in an amount of not more than about 2% of the total feed gas passed over the catalyst. Besides oxygen, the feed gas may contain gas which is inert under the reaction conditions, such as nitrogen. Air is particularly preferred as a source of oxygen and nitrogen as it is cheaply and abundantly available.

The invention will be further described with respect to the following examples.

EXAMPLE 1

This example shows the usefulness of catalysts used in methods according to the present invention for CO oxidation. Results using a supported liquid phase Wacker type catalyst are shown for comparison.

The supported liquid phase Wacker type catalyst was prepared by soaking alumina beads in a $CuCl_2/PdCl_2$ mixture prepared in the proportions taught by C. L. Thomas in the publication quoted above. Six grams of catalyst was tested at room temperatures at an air flow of 2 L/minute containing 60 ppm CO.

Although the test results for the supported liquid phase Wacker type catalyst used in the text indicated a slightly poorer performance than the results given for similar catalyst by M. F. Collins in the publication quoted above, the trends are similar.

The following three catalysts were used in methods according to the present invention:

Catalyst A

Porous supports of silica granules of size 5–10 mesh were platinized so that the platinum loading was between 5 wt % and 10 wt % of the total weight of the catalyst and then the granules were rendered hydrophobic by treatment with a methylsilane. Six grams of this catalyst was tested with 60 ppm of CO in an air flow of 2 L/min at room temperature.

Catalyst B

A hydrophobic plastic support prepared by the copolymerization of divinylbenzene and styrene was platinized to yield a final loading of between 6 wt % and 10 wt % of the total weight of the catalyst metal and tested with 60 ppm of CO in an air flow of 2 L/min at room temperature.

Catalyst C

A mixture of between 5 wt % and 10 wt % platinum plus 3 wt % to 5 wt % rhodium, based on the total weight of the catalyst metal and the support was deposited onto a similar hydrophobic plastic support to that used for catalyst B. Tests were performed on two grams of catalyst with air containing 60 and 700 ppm CO at a flow rate of 1.5 L/minute.

The results of the tests are given in the following Table I.

TABLE 1

| | Conversion (%) by volume of CO and $CO_2$ | | | | |
| --- | --- | --- | --- | --- | --- |
| | $PdCl_2/CuCl_2$ (6g) (Wacker Type) | Catalyst A (6g) | Catalyst B (6g) | Catalyst C (2g) | |
| Relative Humidity | 60 ppm CO feed | 60 ppm CO feed | 60 ppm CO feed | 60 ppm CO feed | 70 ppm CO feed |
| 0 | 40 | 100 | 25 | 100 | 62 |
| 50 | 80 | 100 | 66 | 85 | — |
| 100 | 30 | 100 | 83 | 60 | 70 |

EXAMPLE 2

A catalyst was tested which comprised a mixture of 9% platinum and 1% rhodium on a hydrophobic plastic support prepared by the copolymerization of styrene and divinylbenzene. 1 L/min of dry air (0% relative humidity) containing 50 ppm CO was passed over 0.4 gm of the supported catalyst. 60 to 65% of the CO was reacted. Conversion of CO to $CO_2$ increased to 70% when the relative humidity of the air was in the range from 20% to 100%.

EXAMPLE 3

A hydrophobic porous plastic/polymeric support of the type prepared by co-polymerization of styrene and divinylbenzene was treated with a solution of the acid chloride salts of platinum and iridium to yield a final metal loading of about 10% with a ratio of Pt to Ir in solution of about 9 to 1. At room temperature and 50% relative humidity, 0.4 g of this catalyst reduced the carbon monoxide content of air from 50 ppm to below 10 ppm at an air flow of 1 L/min.

EXAMPLE 4

Air at 34° C. and 100% relative humidity, and containing 185 ppm by volume of ethanol, was passed over the catalyst of Example 3. Over 90% of the ethanol was converted to carbon dioxide.

EXAMPLE 5

One gram of a catalyst similar to that described in Example 2, except that the metal loadings were doubled, was exposed to flowing dry air containing 2-propanone, and the effluent gas was monitored for water vapor. Water vapor is one of the oxidation products. Water vapor was observed in the effluent air, indicating oxidation of 2-propanone.

EXAMPLE 6

A porous polymeric support similar to that in Example 2 was treated with a solution of the acid chloride salt of iridium to yield a final iridium content of about 10%. At room temperature and 50% relative humidity, 0.4 g of this catalyst reduced the carbon monoxide content of air from 50 ppm to below 1 ppm at an air flow of 1 L/min.

EXAMPLE 7

A porous polymeric support similar to that in Example 2 was treated with a solution of the acid chloride salt of iridium to yield a final iridium content of about 1%. At room temperature and 50% relative humidity, 0.4 g of this catalyst reduced the carbon monoxide content of air from 50 ppm to 43 ppm at an air flow of 1 L/min.

EXAMPLE 8

In further tests to demonstrate the usefulness of catalysts used in methods according to the present invention for the oxidation of formaldehyde (HCHO) in aqueous solutions to $CO_2$ and water, a conventional catalyst comprising platinum on hydrophilic silica was used for comparison.

In each of the tests 200 mL of 1850 ppm formaldehyde in water was passed over 1 g of catalyst. $CO_2$ was then purged from the reaction mixture with air.

The results of these tests are given in the following Table II.

TABLE II

| Catalyst | Reaction Temp. (°C.) | Reaction Time (mins) | Conversion (%) by Volume |
|---|---|---|---|
| 10 wt % Pt on styrenedivinylbenzene | 90 | 60 | 93 |
| 10 wt % Pt on styrenedivinylbenzene | 25 | 120 | 11 |
| styrenedivinylbenzene only | 90 | 120 | 0 |
| 10 wt % Pt on Hydrophilic silica | 90 | 60 | 1 |

These results show that the styrenedivinylbenzene alone does not function as a catalyst, and that the conventional hydrophilic silica is inactive as a catalyst under these conditions.

EXAMPLE 9

The present process and catalysts can be used in the recombination of CO and $O_2$ to form $CO_2$ in the gas space in a $CO_2$ laser. It is well known that in $CO_2$ lasers, $CO_2$ is broken down to CO and $O_2$ during normal operation of the laser. Elevated levels of $O_2$ cause a reduction in the power output of the laser. To control $O_2$ levels, the laser cavity is purged with the laser gas mixture ($CO_2+N_2+He$) during operation.

There are economic advantages to eliminating this purge system. Particular advantages are obtained when the $CO_2$ is $^{13}CO_2$, as this isotopic variant is quite expensive, and continuous purging is not desirable. To demonstrate this process, tests were conducted in a Lumonics K921 $CO_2$ laboratory laser. The laser was operated for three two-hour periods, while power output was monitored. Between each period of operation, the laser was purged.

In one two-hour operating period, CO and $O_2$ were not removed from the laser gas space. The laser power output continuously decreased during operations; after 2 hours of operation, power output had decreased to about 30% of full power.

A platinum-silica catalyst was prepared by exchange platinization of the tetra-amine chloride salt of platinum onto 10–20 mesh granules of hydrophobic silica. The platinization was performed in two sequential stages; the platinum loading was approximately 9.5% after the first stage, and 13% after the second. The salt was decomposed in flowing hydrogen at about 200° C. after each loading.

A 50 g sample of the preferred catalyst was mounted in 6 mm thick baskets located in front of small fans used to mix the gas in the laser gas compartment, in a manner such that the gas was forced to flow through the catalyst bed. The output power of the laser decreased more slowly than in the previous test. After 2 hours, laser power had decreased to 56% of full power, where it stabilized.

In another test, the silica catalyst was replaced by 30 g of 9% Pt and 1% Ir on SDB granules. Laser power decreased by only 27% to 73% of full power where it stabilized.

Catalyst assemblies used in methods according to the present invention are generally catalytically active for longer periods of time than oxidation catalyst assemblies used in known methods in the presence of liquid water and water vapor, and in many instances function well at ambient temperatures.

It is understood that the invention has been disclosed herein in connection with certain examples and embodiments. However, such changes, modifications or equivalents as can be used by those skilled in the art are intended to be included. Accordingly, the disclosure is to be construed as exemplary, rather than limitative, and such changes within the principles of the invention as are obvious to one skilled in the art are intended to be included within the scope of the claims.

We claim:
1. A method of oxidizing a gaseous substance selected from the group consisting of carbon monoxide, ethanol, methanol, 2-propanone and formaldehyde in a feed gas, which process comprises passing such gaseous substance and oxygen at an input temperature of −50° to 150° C., in which the gaseous substance is present as less than 2% of the feed gas, and the balance of the feed gas is oxygen and gases which do not inhibit oxidation of the said gaseous substance under the reaction conditions; into contact with
   (a) a hydrophobic, porous catalyst having a specific surface area of from 200 to 600 m²/g support, formed of porous copolymerized styrene divinylbenzene, and
   (b) a catalytically active metal on the support, the catalytically active metal being selected from the group consisting of chromium, molybdenum, tungsten, manganese, rhenium, iron, ruthenium, osmium, cobalt, rhodium, iridium, nickel, palladium, platinum, copper and silver, the amount of catalytically active metal being in the range of 0-1 to 22 wt % of the total weight of the support and catalytically active metal.

2. A method for oxidizing a gaseous substance selected from
   (a) CO
   (b) an aldehyde having 1-5 carbon atoms
   (c) an alcohol having 1-5 carbon atoms
   (d) a ketone having 3-5 carbon atoms which process comprises passing such gaseous substance and an oxidizing gas at an input temperature of −50° to 150° C. into contact with
   (a) a hydrophobic, porous catalyst support having a specific surface area of from 50 m²/g to 1500 m²/g formed from a silylated silica, and
   (b) a catalytically active metal on the support, the catalytically active metal being at least one metal selected from the group consisting of chromium, molybdenum, tungsten, manganese, rhenium, iron, ruthenium, osmium, cobalt, rhodium, iridium, nickel, palladium, platinum, copper, and silver, and the amount of the catalytically active metal being in the range of 0.1 to 22 wt % of the total weight of the support and catalytically active metal.

3. A method according to claim 2, in which the oxidizing gas is oxygen.

4. A method according to claim 2, wherein the surface area of the support is in the range 200 to 600 m²/g.

5. A method according to claim 1 or 2, wherein the catalytically active metal comprises at least two metals selected from the group consisting of platinum, palladium, rhenium, osmium, iridium, cerium, rhodium and ruthenium, and one of the metals is present in a ratio in the range 1:1 to 40:1, by weight, to that of the other metal or metals present.

6. A method according to claim 5 wherein platinum comprises one of said at least two metals.

7. A method as claimed in claim 1 or 2, in which the said gaseous substance and oxidizing gas are present as components of a gas mixture in which the gaseous substance comprises not more than 2% of the gas mixture and the oxidizing gas is present in a stoichiometric excess over the gaseous substance.

8. A method according to claim 2, in which the said gaseous substance is present as less than 2% of a feed gas, and the balance of the feed gas is the oxidizing gas and gases which do not inhibit oxidation of the said gaseous substance under the reaction conditions.

9. A method of oxidizing a gaseous substance selected from
   (a) CO,
   (b) an aldehyde having 1-5 carbon atoms,
   (c) an alcohol having 1-5 carbon atoms,
   (d) a ketone having 3-5 carbon atoms, which process comprises passing such gaseous substance and oxygen at an input temperature of −50° to 150° C., in which the gaseous substance is present as less than 2% of the feed gas, and the balance of the feed gas is oxygen and gases which do not inhibit oxidation of the said gaseous substance under the reaction conditions; into contact with
   (a) a hydrophobic, porous catalyst having a specific surface area of from 200 to 600 m²/g support, formed of porous copolymers of divinylbenzene with styrene or a substituted styrene having the formula:

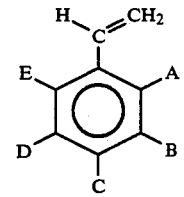

in which A to E are at least one substituent selected from the group consisting of hydrogen and lower alkyl ($C_1$ to $C_4$) groups, and
   (b) a catalytically active metal on the support, the catalytically active metal being selected from the group consisting of chromium, molybdenum, tungsten, manganese, rhenium, iron, ruthenium, osmium, cobalt, rhodium, iridium, nickel, palladium, platinum, copper and silver, the amount of catalytically active metal being in the range of 0-1 to 22 wt. % of the total weight of the support and catalytically active metal.

10. A method according to claim 1 wherein the gaseous substance is at least one substance selected from the group consisting of carbon monoxide, ethanol, methanol and formaldehyde.

11. A method according to claim 2 wherein the gaseous substance is at least one substance selected from the group consisting of:
   (a) CO,
   (b) an aldehyde having 1-5 carbon atoms, and
   (c) an alcohol having 1-5 carbon atoms.

12. A method according to claim 9 wherein the gaseous substance is at least one substance selected from the group consisting of:
   (a) CO,
   (b) an aldehyde having 1-5 carbon atoms, and
   (c) an alcohol having 1-5 carbon atoms.

13. A method according to claim 12 wherein the gaseous substance is at least one substance selected from the group consisting of carbon monoxide, ethanol, methanol and formaldehyde.

14. A method according to claim 10, 11 or 13 wherein the catalytically active metal is at least one metal selected from the group consisting of rhenium, ruthenium, osmium, rhodium, iridium, palladium, platinum and silver.

15. A method according to claim 14 wherein the catalytically active metal is platinum and at least one metal selected from the group consisting of iridium and rhodium, one of the metals being present in the range 1:1 to 40:1 to that of the other catalytically active metal or metals.

* * * * *